US005582643A

United States Patent [19]
Takei et al.

[11] Patent Number: 5,582,643
[45] Date of Patent: Dec. 10, 1996

[54] CENTRIFUGAL TUMBLING GRANULATING-COATING APPARATUS

[75] Inventors: Narimichi Takei, Hamamatsu; Kaoru Kurita, Hosoe-cho; Hideyuki Akiyama, Hamamatsu; Kuniaki Yamanaka, Hosoe-cho, all of Japan

[73] Assignee: Freund Industrial Co., Ltd., Tokyo, Japan

[21] Appl. No.: 391,530

[22] Filed: Feb. 21, 1995

[30] Foreign Application Priority Data

Feb. 25, 1994 [JP] Japan .................. 6-027618

[51] Int. Cl.⁶ .................................. A23G 3/00
[52] U.S. Cl. .................. 118/19; 118/20; 118/52; 118/58; 118/303; 118/418
[58] Field of Search ................ 118/19, 20, 52, 118/58, 417, 418, 303; 366/251, 314, 317

[56] References Cited

U.S. PATENT DOCUMENTS

| | | | |
|---|---|---|---|
| 3,201,095 | 8/1965 | Erwein et al. | 366/314 |
| 4,581,242 | 4/1986 | Forster | 118/19 |
| 4,740,390 | 4/1988 | Kulling | 118/303 |
| 4,967,688 | 11/1990 | Funakoshi et al. | 118/303 |

FOREIGN PATENT DOCUMENTS 982506  2/1965  European Pat. Off. ......... 366/314

Primary Examiner—Laura Edwards
Attorney, Agent, or Firm—Kane, Dalsimer, Sullivan, Kurucz, Levy, Eisele and Richard, LLP

[57] ABSTRACT

A centrifugal tumbling granulating-coating apparatus has a rotary disk rotated in the horizontal direction and a stator provided at an outer peripheral position of the rotary disk at a predetermined internal from the rotary disk. The rotary disk is formed therein with a peripheral edge portion having a circularly arcuate-shaped vertical cross-section erected from a flat bottom surface portion and curved upwardly. In the rotary disk, a height (H) from the bottom surface portion to an outer peripheral end is set at a value within a range of $0.30R \leq H \leq R$ to a radius of curvature (R) of the peripheral edge portion, a width (W) of the peripheral edge portion is set at a value within a range of $0.07D \leq W \leq 0.25D$ to a diameter (D) of the rotary disk and the radius of curvature (R) of the peripheral edge portion is set at a value within a range of $0.10D \leq R \leq 0.25D$ to the diameter (D). A powder contact portion of the stator is formed substantially vertically. By use of this centrifugal tumbling granulating-coating apparatus, a powder or granular material in more quantities per batch can be granulated and coated.

2 Claims, 4 Drawing Sheets

CENTRIFUGAL TUMBLING GRANULATING-COATING APPARATUS

BACKGROUND OF THE INVENTION

1. Field of the Invention

This invention relates to techniques of granulating of pharmaceuticals and food-stuffs, etc., spherically or centrifugal tumbling granulating and coating for applying coating to spherical granules.

2. Statement of the Related Art

A centrifugal tumbling granulating-coating apparatus (hereinafter referred to as a "CF apparatus") as being an apparatus for applying coating to spherical granules are widely put on the market as being represented by a centrifugal tumbling coating-granulating apparatus, "CF-GRANULATOR manufactured by Freund Industrial Co., Ltd", for example. The construction of this CF apparatus is like one shown in FIG. 3. Originally, the CF apparatuses have been developed to make coating of tablets and the like as its main use. However, by now, the spherically granulating and coating of pharmaceutical layers onto the surfaces of the spherical granules have become the main uses.

In these uses, it is required to produce in high yield the spherical granules which are satisfactory in roundness within a predetermined range of grain size, and to provide uniform coating layers onto the spherical granules. Then, in order to satisfy these requirements, there have heretofore been made various proposals on the construction and shape of the CF apparatuses.

That is, for example, the followings are known as the CF apparatuses suitable for coating of the tablets and the like. According to "a coating method and an apparatus therefor" described in Japanese Patent Publication No. 46-22544, as shown in FIG. 4, there is known a coating pan 27 including a rotary disk for being rotated horizontally at a central portion, a curved surface portion 25 provided around this rotary disk 24 and a cylindrical portion 26 connected to the curved surface portion 25. According to "a coating method and an apparatus therefor" described in Japanese Patent Publication No. 46-10878, as shown in FIG. 5, there is known a coating pan 37 including a rotary disk 34 for being rotated horizontally and a curved surface fixed wall 35.

According to "an automatic coating apparatus for particles" described in Japanese Patent Publication No. 54-992, as shown in FIG. 6, there is disclosed an automatic particle coating apparatus 47, in which moisture in the coating apparatus is measured by a moisture detector, whereby the feeding speed of a binder and hot air for drying are controlled. Furthermore, according to "compression molding and granulation of pharmaceuticals" as being a thesis presented for a degree to the Tohoku University by Mr. Yoshiro Funakoshi, as shown in FIG. 7, a centrifugal tumbling coating apparatus 57, in which a fixed wall 55 is in curved inwardly.

The inventors of the present invention have found that, although these CF apparatuses, particularly those being sold in the market at present, are suitable for coating the tablets and the like and for processing the spherical granules and the like, further improvements are necessary to better performance.

That is, the capacity of processing the powder or granular material in the standard CF apparatuses sold in the market at present is set at 30–50 kg/batch on the basis of the finished product, i.e. the apparatuses having a diameter of the rotary disk of 1,000 mm, in the case in which the powder or granular material more than this amount is charged, the powder or granular material cannot be tumbled satisfactorily, whereby the particles having satisfactory roundness cannot be produced. The limit of the processing capacity in these CF apparatuses has been put up with as an inevitable characteristics of the CF apparatuses.

Recently, in pharmaceutical manufactures, a size of a drug-manufacturing apparatus has being large so that the production per batch may be increased, corresponding thereto, to increase the production per batch of the CF is demanded. Here, in order to satisfy this requirement, as far as the shape of the CF apparatuses is not changed, it is necessary to provide further large-sized CF apparatuses.

However, in the CF apparatus, it is required to hold a slit width between a side wall and the rotary disk to be narrow in order to prevent the powder or granular material on the rotary disk from dropping, so that it is very difficult to make the apparatuses be large-sized in view of the accuracy of manufacturing. Then, at present, while the high costs and the increased installation area are put up with, a multitude of the CF apparatuses are provided, whereby pharmaceutical manufactures has been corresponding to increase in the manufacturing capability.

The inventors of the present invention have analyzed the conventional CF apparatuses from the viewpoint of that the limit of the above-described processing capacity may be cleared by effectively acting the centrifugal force for tumbling the powder or granular material on each of the particles. As the result, it has been found that, under the shapes of the CF apparatuses which have been known by now, the centrifugal force cannot be satisfactorily acted on the particles. For example, in a CF apparatus 67 being put on the market at present as shown in FIG. 3, the peripheral edge portion of a rotary disk 64 and a side wall are continuous with each other with a slightly clearance, and a radius of curvature of the continuous part thereof is small, friction loss of energy is therefore increased when the powder or granular material, which has received centrifugal force, is tumbled in the vertical direction and the tumbling action on a fixed wall is decreased, thereby restricting the upper limit of a charged volume. Furthermore, in apparatuses 27, 37 and 47 as described in the documents shown in FIGS. 4 through 7, the radii of curvature of connecting portions are large, however, rotary disks 24, 34 and 44 do not reach the vertical portions of inner walls, so that satisfactory centrifugal force cannot be obtained (FIGS. 4 to 6), or, the inner walls are curved inwardly, whereby surplus resistance is generated, so that the centrifugal force is reduced (FIG. 5 and 7). The productivity in the prior art is therefore low.

SUMMARY OF THE INVENTION

It is an object of the present invention to provide a technique of centrifugal tumbling coating of a powder or granular material, which can perform granulating and coating of the powder or granular material in more quantities per batch.

The following is the description of the outline of the typical one from among the inventions disclosed in the present application. That is, a centrifugal tumbling granulating-coating apparatus according to the invention, which is completed by the inventors of the present invention is the one, in which the powder or granular material is fed into a centrifugal tumbling chamber for performing granulating and coating of the powder or granular material, and comprises a rotary disk rotated by a driving means in the horizontal direction and a cylindrical fixed portion provided on the outer peripheral position of this rotary disk at a predetermined interval from the rotary disk. The rotary disk is formed therein with a peripheral edge portion having a circularly arcuate-shaped cross-section erected from a flat bottom surface portion and curved upwardly, a height (H) from the bottom surface portion to the outer peripheral end is set at a value within a range of 0.30 R≦H≦R to a radius of curvature (R) of the peripheral edge portion, a width (W) of the peripheral edge portion is set at a value within a range of 0.07 D≦W≦0.25 D to a diameter (D) of disk, and the radius of curvature (R) of the peripheral edge portion is set at a value within a range of 0.10 D≦R≦0.25 D to the diameter (D). A powder contact portion of a fixed portion, i.e., a portion contacting the powder or granular material during the centrifugal tumbling is formed substantially vertically into a cylindrical shape. In this centrifugal tumbling granulating-coating apparatus, a raised portion may be provided at the central portion of the bottom surface portion.

Furthermore, a method of performing centrifugal tumbling granulating and coating of the powder or granular material according to the present invention is the one of performing granulating and coating of the powder or granular material by use of the above-described centrifugal tumbling granulating-coating apparatus, in which the rotary disk formed therein with the peripheral edge portion which is curved upwardly is rotated in the horizontal direction to be tumbled the powder of granular material on the disk centrifugally.

Then, the method of granulating the powder or granular material according to the present invention is the one, in which granulation is performed by bonding particles of the powder or granular material each other by the above-described centrifugal tumbling granulating and coating of the powder or granular material, and the method of coating of the powder or granular material according to the present invention is the one, in which coating layers are formed on the particles of the powder or granular material by the above-described the centrifugal tumbling granulating and coating apparatus of the powder or granular material.

According to the above-described technique of performing the centrifugal tumbling granulating and coating, the centrifugal force effectively acts on each of the particles of the powder or granular material by the rotation of the rotary disk formed therein with the peripheral edge portion curved upwardly and set at the above described specified rates of the dimensions, whereby the powder or granular material is pushed up along the fixed portion with the centrifugal force not being reduced, so that the powder or granular material in larger quantities can be processed per batch.

The above-described and other objects and the novel features of the present invention will become apparent more fully from description of this specification in conjunction with the accompanying drawings.

DETAILED DESCRIPTION OF THE PREFERRED EMBODIMENT

Detailed description will hereunder be given of one embodiment of the present invention in conjunction with the accompanying drawings.

Figure 1:
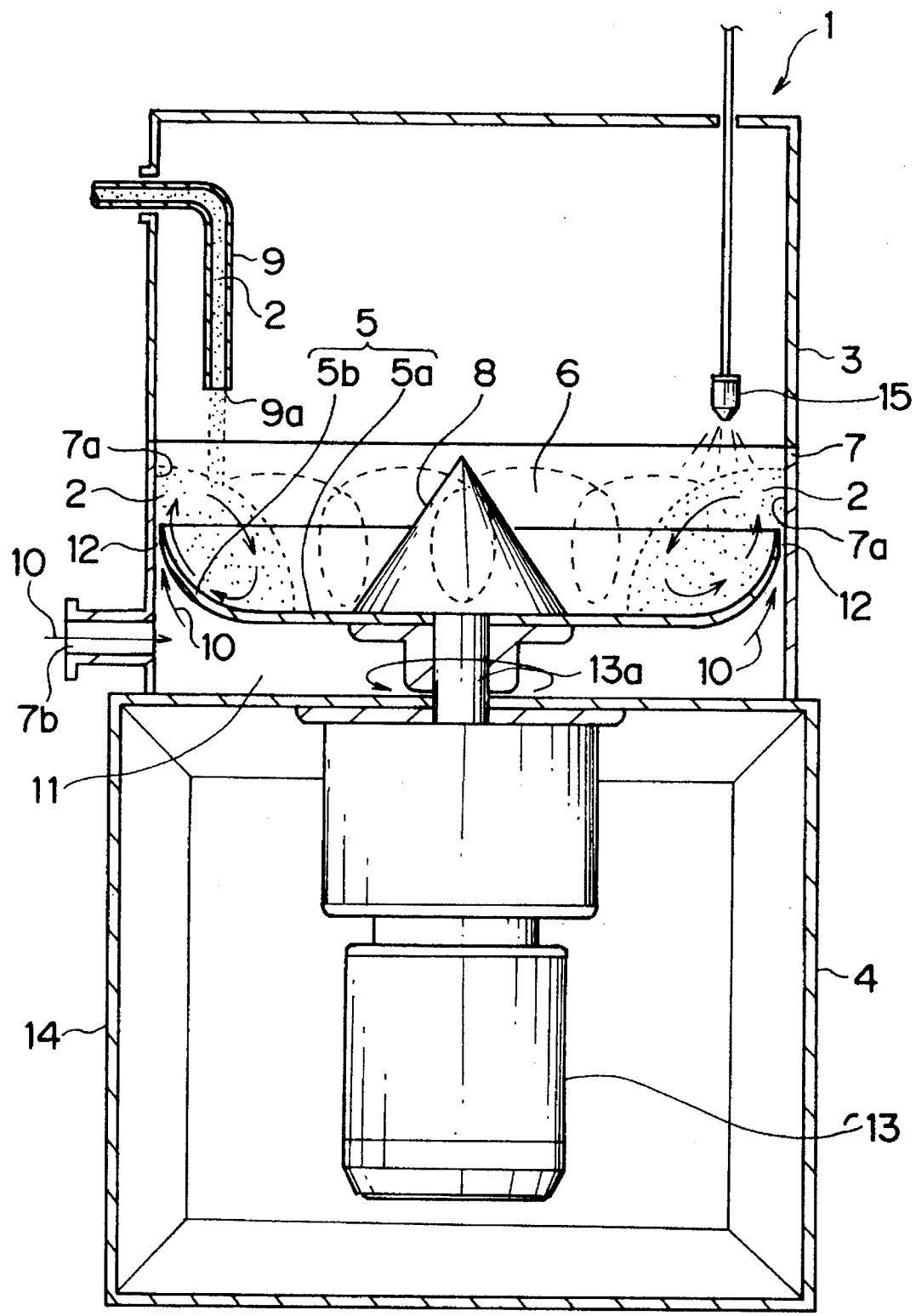
FIG. 1 is a cross-sectional view showing the centrifugal tumbling granulating-coating apparatus, which is one embodiment of the present invention.
Figure 2:
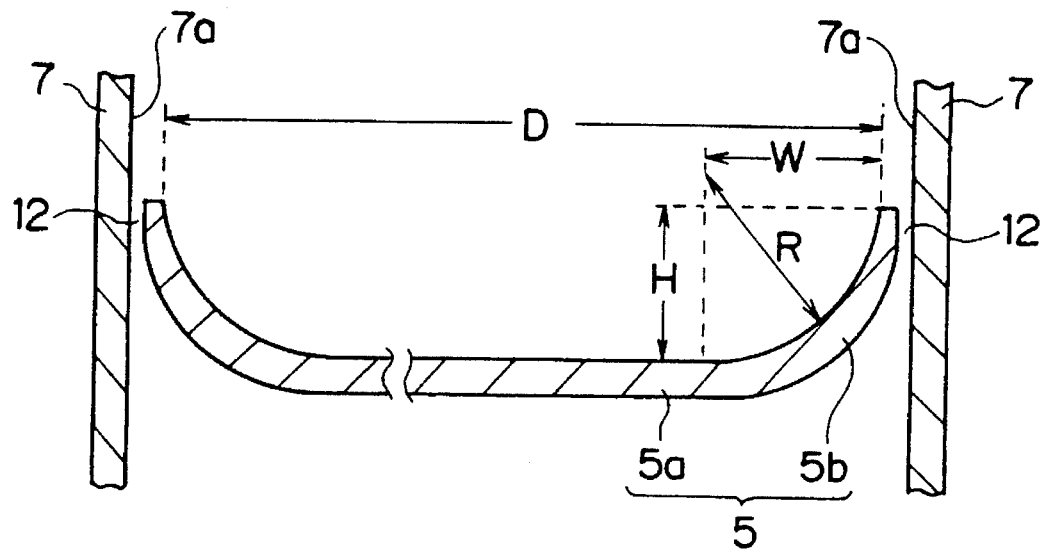
FIG. 2 is a cross-sectional view of the essential portions, showing the centrifugal tumbling granulating-coating apparatus.

FIG. 1 is the cross-sectional view showing one embodiment of the centrifugal tumbling granulating-coating apparatus according to the present invention. FIG. 2 is the cross-sectional view of the essential portions, showing the above-mentioned centrifugal tumbling granulating-coating apparatus.

As shown in FIG. 1, a centrifugal tumbling granulating-coating apparatus 1 in this embodiment comprises a centrifugal tumbling section 3 positioned upwardly and a rotatably driving section 4 positioned downwardly is an apparatus. In this apparatus, a powder or granular material 2 is centrifugally tumbled, a binder liquid and powder are added thereto at a predetermined speed, spherical granules and the like are granulated by use of the grains as cores or by bonding respective particles of powder each other, while the above-mentioned spherical granules are centrifugally tumbled, the powder and the binder liquid are added thereto, and coating layers are formed thereon.

The centrifugal tumbling section 3 houses therein a rotary disk 5 for centrifugally tumbling the powder or granular material 2 which is charged, to thereby form a centrifugal tumbling chamber 6, and is provided with a cylindrical stator (fixed portion) 7 as being a housing in a manner to surround this rotary disk 5 at a predetermined interval therefrom.

The rotary disk 5 has a bottom surface portion 5a which is flat and positioned at the central portion and a peripheral edge portion 5b having a circularly arcuate-shaped cross-section erected from this bottom surface portion 5a and curved upwardly. Here, as shown in FIG. 2, a height (H) of the rotary disk 5 from the bottom surface portion 5a to an outer peripheral end and a radius of curvature (R) of the peripheral edge portion 5b are set at a rate of 0.64 R=H. Furthermore, a width (W) of the peripheral edge portion 5b and a diameter (D) of the rotary disk 5 are set at a rate of 0.15 D=W, and the radius of curvature (R) of the peripheral edge portion and the diameter (D) of the rotary disk 5 are set at a rate of 0.16 D=R, respectively.

The inventors of the present invention have found that, in order to effectively act the centrifugal force on individual particles of the containing powder and grains 2 placed on the rotating rotary disk 5 to cause the particles to tumble centrifugally and to efficiently push up the particles along an inner wall surface of the stator 7, it is necessary that the peripheral edge portion 5b curved upwardly is formed and the rates of dimensions between H, R, W and D as described above are set within the ranges of 0.30 R≦H≦R, 0.07 D≦W≦0.25 D and 0.10 D≦R≦0.25 D.

Figure 3:
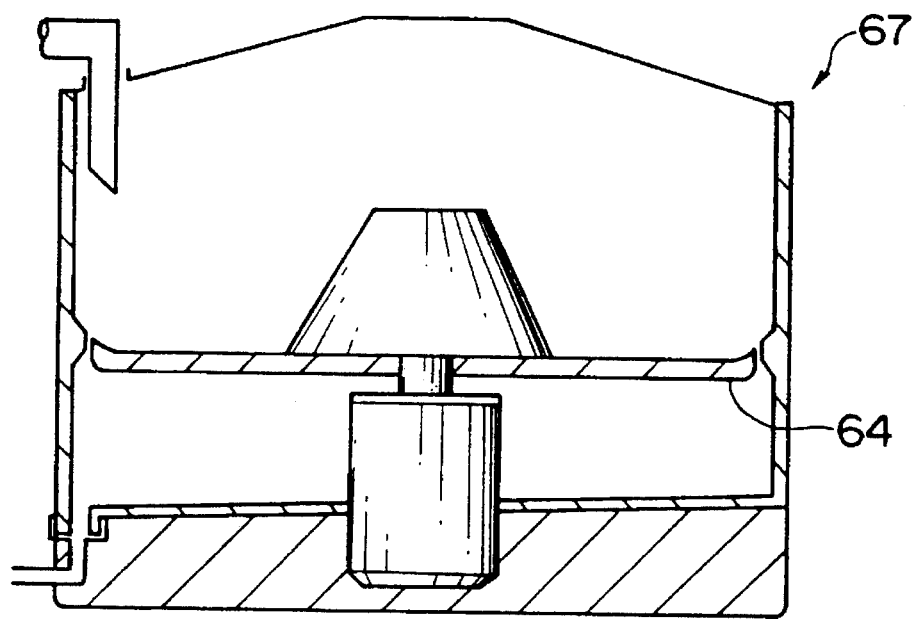
FIG. 3 is a cross-sectional view showing an example of the conventional centrifugal tumbling granulating-coating apparatus.
Figure 4:
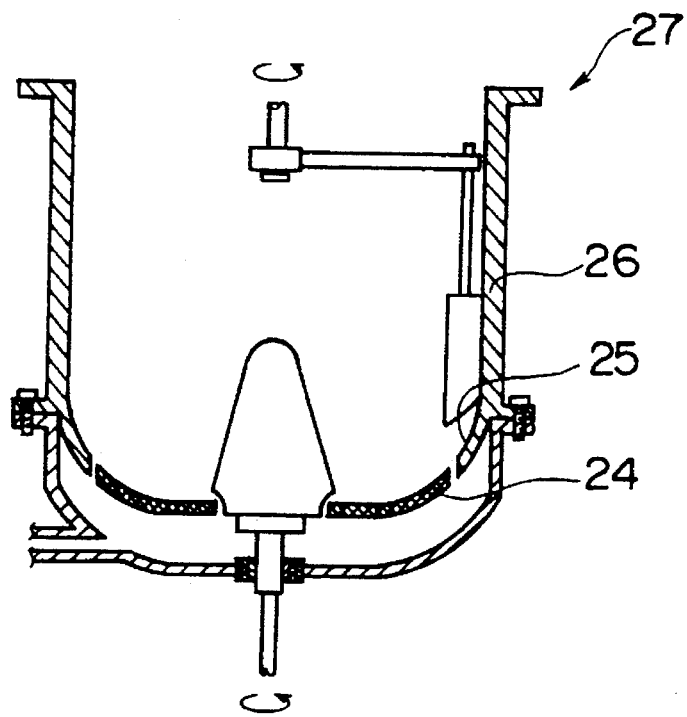
FIG. 4 is a cross-sectional view showing another example of the conventional centrifugal tumbling granulating-coating apparatus.
Figure 5:
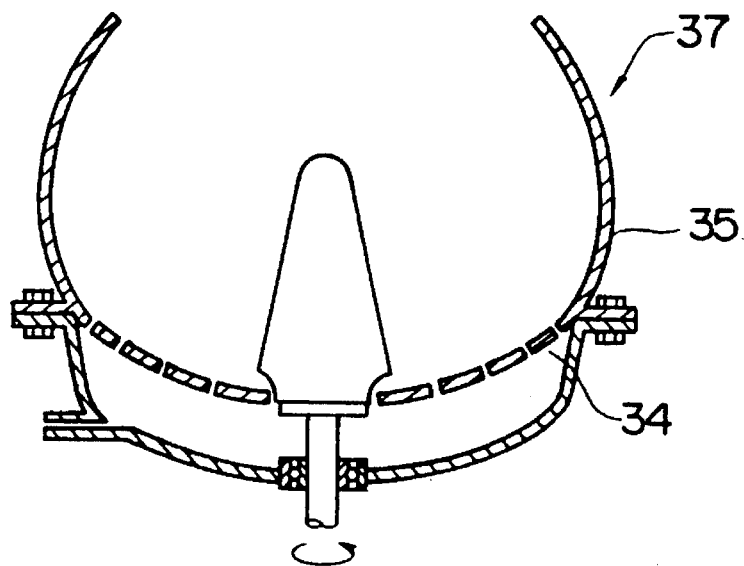
FIG. 5 is a cross-sectional view showing a further example of the conventional centrifugal tumbling granulating-coating apparatus.
Figure 6:
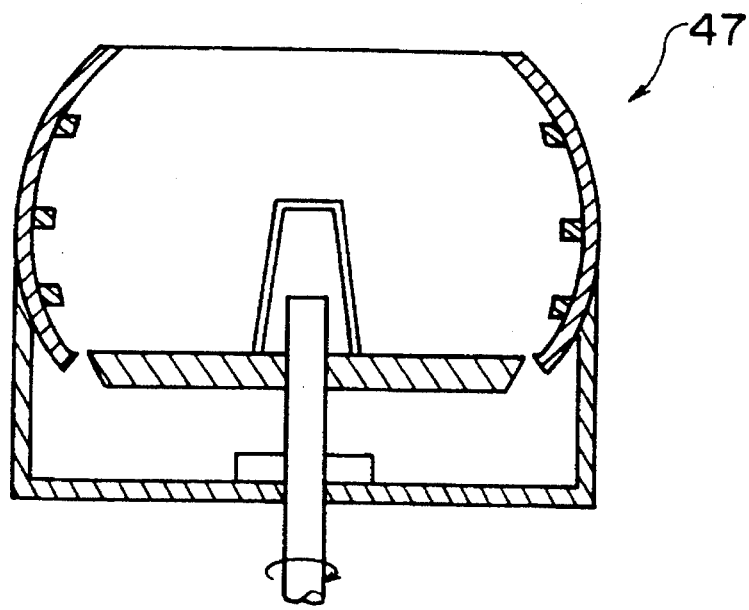
FIG. 6 is a cross-sectional view showing a still further example of the conventional centrifugal tumbling granulating-coating apparatus.
Figure 7:
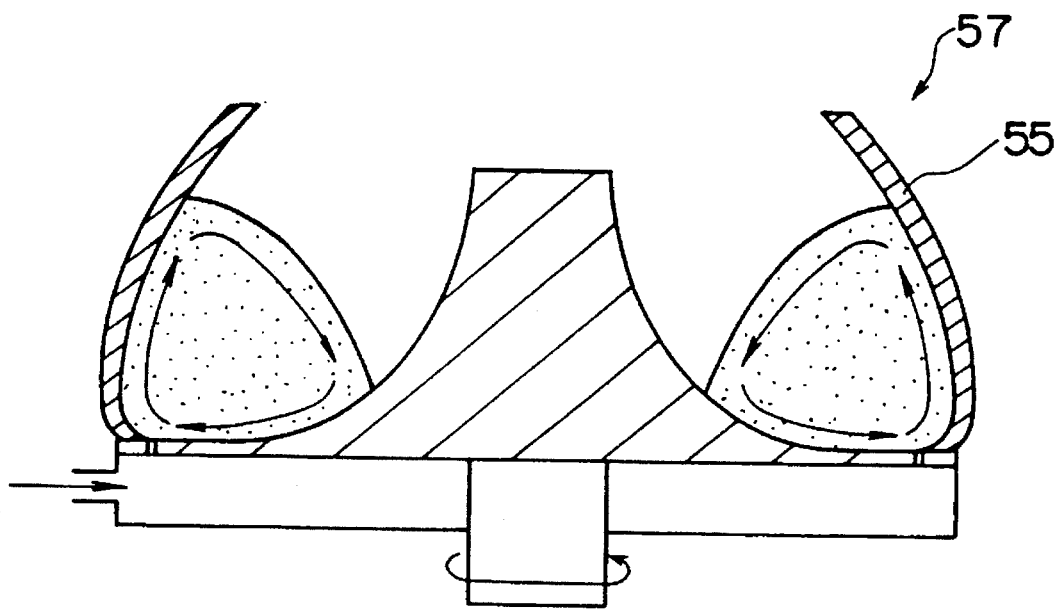
FIG. 7 is a cross-sectional view showing a yet further example of the conventional centrifugal tumbling granulating-coating apparatus.

When H is less than 0.30 R, an angle made between the rotary disk 5 and the stator 7 is large, so that the powder or granular material 2 cannot be pushed up effectively by the centrifugal force in the horizontal direction. When H exceeds R, the peripheral edge portion 5b becomes a curved surface directed inwardly. In either case, there is presented a disadvantage. That is to say, the problems occur in case of the former, which are similar to the problems of the prior apparatus shown in FIG. 3, and the problems occur in case of the latter, which are similar to the problems of the prior apparatus shown in FIG. 4,5,6 and 7. Furthermore, when W is less than 0.07 D, the curved surface of the peripheral edge portion 5b cannot be provided effectively. When W exceeds 0.25 D, the bottom surface portion 5a becomes small in area, so that the powder or granular material 2 cannot be tumbled satisfactorily. Then, when R is less than 0.10 D, the rise of the peripheral edge portion 5b is too steep, whereby the resistance at the time of pushing up the powder or granular material 2 by use of the centrifugal force is increased. When R exceeds 0.25 D, two conditions of securing an angle between the rotary disk 5 and the stator 7, which is necessary for pushing up the powder or granular material 2, and of securing the necessary area of the bottom surface portion 5a cannot be satisfied simultaneously. Therefore, in the rotary disk 5 in this embodiment, there are set the ranges 0.64 R=H, 0.15 D=W and 0.16 D=R as described above.

A conical raised portion 8 is formed at a central portion of the rotary disk 5. By this raised portion 8, the rotary disk 5 is prevented from being distorted to secure the strength, and the powder or granular material 2, which is positioned at about the center of the rotary disk 5 is actively moved toward the peripheral-edge portion 5b where the centrifugal tumbling action is performed.

A supply pipe 9 for supplying the powder or granular material 2 is provided over the rotary disk 5 from above the centrifugal tumbling cheer 6 in a manner to face an opening 9a to the rotary disk 5. Further, there are provided a binder liquid stored in a tank, not shown, and a spray nozzle 15 for spraying onto this powder or granular material 2.

Out of inner wall portions of the stator 7, a portion contacting the powder or granular material 2 during the centrifugal tumbling, i.e., a powder contact portion 7a is formed substantially vertically to the bottom surface portion 5a of the rotary disk 5, whereby the powder or granular material 2, which has been centrifugally tumbled by the rotary disk 5 is pushed up along the powder contact portion 7a without being subjected to surplus resistance. A gas inlet 7b for taking air (gas) 10 into a cheer 11 formed below the rotary disk 5 is provided in the stator 7. Then, the air 10, which has been taken in is introduced into the centrifugal tumbling chamber 6 through a slit 12 formed between the rotary disk 5 and the stator from the chamber 11. Accordingly, the powder or granular material 2 is prevented from dropping between the rotary disk 5 and the stator 7, and drying of the powder or granular material 2 is facilitated by this air 10.

A motor (driving means) 13 for rotating the rotary disk 5 is provided in the rotatably driving section 4, being housed in a casing 14. A shaft 13a of this motor 13 is fixed to a center shaft of the rotary disk 5, whereby the rotary disk 5 is rotated in the horizontal direction.

An experimental example of manufacturing sucrose spherical granules by use of the CF apparatus shown in this embodiment will hereunder be illustrated.

The dimensions of the rotary disk of the CF apparatus are such that the diameter (D) is 715 mm, the radius of curvature (R) of the peripheral edge portion is 110 mm, the height (H) from the bottom surface portion to the outer peripheral end is 70 mm and the width (W) of the peripheral edge portion is 102 mm. And, the speed of rotation of the rotary disk is set at 150 rpm.

Granulated sugar of 100 parts by weight having a mean particle diameter 270 micron meter is charged as the cores, while the rotary disk is rotated, air is introduced through the slit formed between the inner wall of the stator and the rotary disk, and, while sucrose syrup of 50 parts by weight is sprayed from the spray nozzle, powder sugar of 200 parts by weight is added from a powder supply device little by little. The temperature of the introduced air is 29°±1° C. and the moisture is 37.5±0.5%. As As a comparative example, sucrose spherical granules were manufactured in the same manner as above by use of a CF-750 apparatus being put on the market shown in FIG. 3 (manufactured by Freund Industrial Co., Ltd, in which D=750 mm, R=70 mm, H =16 mm and W=32 mm).

As the result of this experiment, according to the CF apparatus shown in this embodiment, sucrose spherical granules of 75 kg/batch on the basis of the finished product were obtained under the satisfactory roundness and grain size distribution. On the other hand, in a CF-750 apparatus, a limit was set at obtaining sucrose spherical granules of 52 kg/batch on the basis of the finished product. When the quantities of charge exceeding this, the roundness becomes unsatisfactory and the grain size distribution is too wide, so that it is not suitable for practical use.

With this arrangement, the processing capacity can be improved substantially, so that the number of installation of the CF apparatuses can be decreased, the costs can be reduced and the area of installation can be decreased.

Detailed description of an embodiment of present invention has hereinabove been given, however, the present invention should not necessarily be limited to the above embodiment, and it is needless to say that the present invention can be modified variously within the limit of not departing from the technical gist.

For example, in the rotary disk 5 in this embodiment, the height (H) from the bottom surface portion 5a to the outer peripheral end and the radius of curvature (R) of the peripheral edge portion 5b are set at the rate of 0.64 R=H, the width (W) of the peripheral edge portion 5b and the diameter (D) of the rotary disk 5 are set at the rate of 0.15 D=W, and the radius of curvature (R) of the peripheral edge portion 5b and the diameter (D) of the rotary disk 5 are set at the rate of 0.16 D=R, however, these numerical values show some examples, and, as far as the rates are limited within the ranges of $0.30 \text{ R} \leq \text{H} \leq \text{R}$, $0.07 \text{ D} \leq \text{W} \leq 0.25 \text{ D}$ and $0.10 \text{ D} \leq \text{R} \leq 0.25 \text{ D}$, any optional rate of dimensions can be set.

Furthermore, the powder contact portion 7a of the stator 7 is made substantially vertical because it is necessary to maximize the processing quantity, however, this does not exclude the formation of a slight curved surface to the extent where the connection with the rotary disk 5 is made smooth. Further, as for the shape of the inner wall of the stator 7 other than the powder contact portion 7a, this portion has no connection with the centrifugal tumbling action of the powder or granular material 2, whereby any optional shape may be adopted, for example, connection may be made to a bag filter housing portion having an enlarged diameter as in a fluidized-bed granulating apparatus. However, the powder contact portion 7a is required to be substantially vertical, and it is not preferable that, for example, formation of the top portion of the powder contact portion 7a to provide a surface curved inwardly and the like cause to generate frictional resistance when the powder or granular material 2 is pushed up, and moreover, to reduce the volume of containing the powder or granular material 2.

The peripheral edge portion 5b of the rotary disk 5 may be formed to provide a circularly arcuate vertical cross-section and is not required to be an accurate circularly arcuate shape. When the peripheral edge portion 5b remains to be an circularly arcuate shape and is not the accurate circular arc, the radius of curvature (R) is set at a mean radius of curvature (R) of the peripheral edge portion 5b.

The bottom surface portion 5a of the rotary disk 5 is formed to provide a flat shape in order to transmit the centrifugal force given to the powder or granular material 2 to the peripheral edge portion 5b at a low loss and to effectively perform the tumbling action of the powder or granular material 2, however, it is optional that the raised portion 8 is provided at the central portion as in this embodiment or the raised portion 8 is not provided. The raised portion 8 in this embodiment has been formed to provide the conical shape, and, it is possible to form the raised portion 8 to provide one of various shapes such as a semi-spherical shape and a frustoconical shape.

It is required that the slit 12 formed between the rotary disk 5 and the stator 7 is narrow in order to prevent the powder or granular material 2 from dropping, however, the interval may be optionally set at any value as far as the drop-preventing function can be attained.

Then, the technique of granulating and coating the powder or granular material as shown in the present invention is applicable to the production of the spherical granules (Trade name: NONPAREIL, manufactured by Freund Industrial Co., Ltd), production of pharmaceuticals having the controlled releasing properties, the enteric releasing properties and the like or the production of spherical granule-shaped pharmaceuticals, and also applicable to the manufacture of spherical food-stuffs and a food material used for topping.

In the above embodiment, the apparatus is used for granulating, but, the present invention is not limited into the embodiment, the apparatus can be used for such as coating, granulating and coating.

It is also possible to only granulate from a powder material into the granules.

It is also possible to coat a granulated material with a liquid material.

What is claimed is:

1. A centrifugal tumbling granulating-coating apparatus, wherein a powder or granular material which is charged into a centrifugal tumbling chamber is granulated and coated, comprising:

a rotary disk rotated by a driving means in a horizontal direction, in which a peripheral edge portion having a vertical cross-section erected from a flat bottom surface portion and curved upwardly is formed, a height (H) from the bottom surface portion to an outer peripheral end is set at a value within a range of $0.30\,R \leq H \leq R$ to a radius (R) of curvature of the peripheral edge portion, a width (W) of the peripheral edge portion is set at a value within a range of $0.07\,D \leq W \leq 0.25\,D$ to a diameter (D) of the rotary disk and the radius of curvature (R) of the peripheral edge portion is set at a value within a range of $0.10\,D \leq R \leq 0.25\,D$ to the diameter (D);

a cylindrical housing provided at an outer peripheral position of the rotary disk at a predetermined interval from the rotary disk, in which a powder contact portion contacting the powder or granular material is formed substantially vertically; and spray means disposed within said cylindrical housing above said rotary disk.

2. A centrifugal tumbling granulating-coating apparatus as set forth in claim 1, wherein a raised portion is provided at a central portion of the bottom surface portion of the rotary disk.

* * * * *